Figure 1:
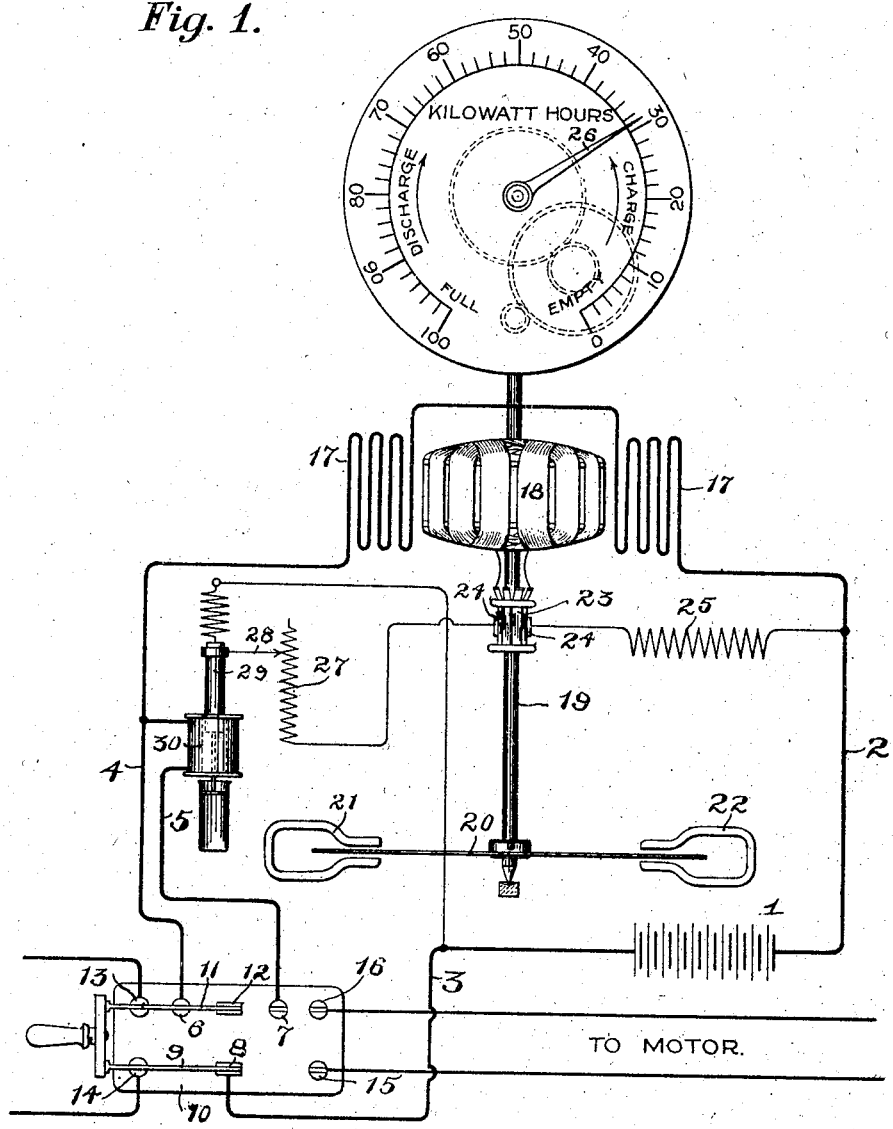

No. 796,056. PATENTED AUG. 1, 1905.
T. DUNCAN.
ELECTRICAL MEASURING INSTRUMENT.
APPLICATION FILED AUG. 26, 1901. RENEWED JAN. 7, 1905.

2 SHEETS—SHEET 1.

WITNESSES:

INVENTOR.
Thomas Duncan
BY Charles A. Brown Cragg & Belfield
ATTORNEYS.

No. 796,056. PATENTED AUG. 1, 1905.
T. DUNCAN.
ELECTRICAL MEASURING INSTRUMENT.
APPLICATION FILED AUG. 26, 1901. RENEWED JAN. 7, 1905.

2 SHEETS—SHEET 2.

WITNESSES:

INVENTOR
Thomas Duncan
BY Charles A. Brown Cragg & Bielfeld
ATTORNEYS.

UNITED STATES PATENT OFFICE.

THOMAS DUNCAN, OF CHICAGO, ILLINOIS.

ELECTRICAL MEASURING INSTRUMENT.

No. 796,056.　　　　　Specification of Letters Patent.　　　　Patented Aug. 1, 1905.

Application filed August 26, 1901. Renewed January 7, 1905. Serial No. 239,979.

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, of which the following is a full, clear, concise, and exact description, reference being had to the accompanying drawings, forming a part of this specification.

My invention relates to meters adapted for use in connection with storage batteries, and has for its object the provision of a meter that is adapted to rotate at different rates of speed per unit of load or energy upon variations in the rate of battery discharge.

By means of my invention the meter is caused to operate at an increased rate of speed per unit of load or energy upon an increase in the rate of discharge.

In the use of storage batteries it is well known that the output of the battery will always be less than the energy stored therein and that the battery loss will increase upon a sufficient increase in the rate of battery discharge. For example, if the battery is charged one thousand ampere-hours at its normal rate of charge—say one hundred amperes for ten hours—the total discharge at the same rate which can be made available without harm to the battery will not be more than about eighty per cent. of the energy charged into the battery with some makes of battery, this battery loss varying with different makes—that is, the battery will effectively operate at one hundred amperes for eight hours, giving out eight hundred ampere-hours after having received one thousand. If the rate of discharge is increased, the total output will be diminished. For example, with certain makes of battery the energy discharged will not be over about seventy per cent. if the rate is increased to one hundred and forty amperes, sixty per cent. if the rate of discharge is doubled, and forty per cent. if the rate of discharge is quadrupled.

I have provided an instrument that is adapted to compensate for the varying battery losses due to the varying rates of discharge, so that the user of the battery may know when the available energy in the battery is spent. Ordinarily a meter associated with a storage battery that is discharged at varying rates will indicate the presence of more energy in the battery than actually exists. The meter of my invention is also adapted to measure the energy that is being stored in the battery, the meter when thus associated with the charging source of current being operatively dissociated from the means that cause the meter to operate at varying rates of speed per unit of load or energy at different rates of discharge.

The meter of my invention is particularly adapted for use in connection with motors employed in operating motor-vehicles, where the rate of discharge is not constant, but is liable to be changed at any time.

In my present invention I provide a resistance adapted to be included in circuit with the meter-winding. This resistance is preferably in circuit with the rotating armature, a solenoid that is included in series with the battery being provided for varying the amount of resistance included in circuit with the armature, according to the rate of battery discharge. The arrangement is preferably such that when the battery is connected with the charging-machine the said resistance is entirely included in circuit with the armature to reduce the torque of the meter to cause it to operate at a slow rate of speed per unit of load or energy, the means for governing the amount of this resistance being then excluded from circuit. When the battery is connected with the translating means, the means for controlling the amount of resistance in circuit with the armature is included in circuit, thereby to automatically vary the quantity of resistance in circuit with the armature according to the battery discharge. I thus provide means for varying the strength of the field due to the armature-winding.

I will explain my invention more fully by reference to the accompanying drawings, in which—

Figure 2:
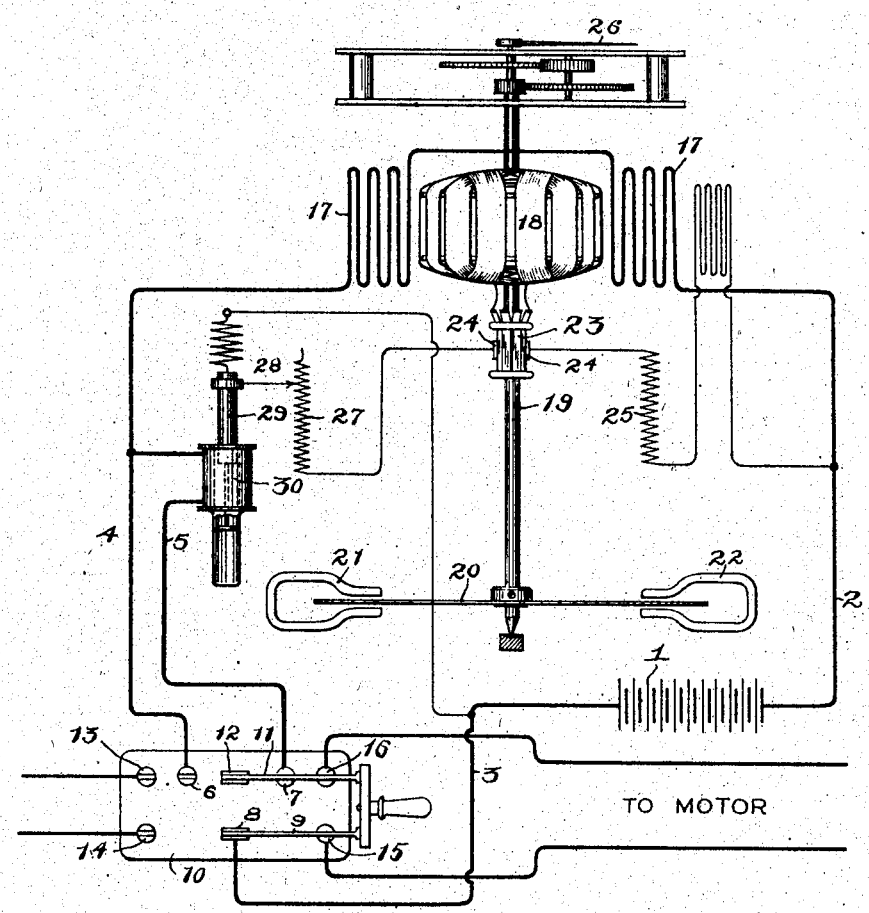

Figure 1 is a diagrammatic view of a storage-battery system with the meter of my invention associated therewith. Fig. 2 is a view similar to Fig. 1, showing the measuring mechanism of the meter in its natural position, the battery in this figure being connected with the translating means.

Like parts are indicated by similar characters of reference in both views.

In each view I have illustrated a storage battery 1 having mains 2 and 3. The main 2 is provided with bifurcated branches 4 5, terminating in contacts 6 and 7, while the main 3 terminates in a pivotal mounting 8, upon which a switch-blade 9 of a switch 10 is secured. A second switch-blade 11 of the switch 10 is also placed upon a pivotal mounting 12. Terminals of a charging-circuit 13 and 14 are illustrated. Terminals 15 and 16 of conductors leading to translating means, as the motor of a motor-vehicle, are also illustrated.

When the switch 10 is thrown to the left, the charging machine or source of current is thrown into circuit with the storage battery. When the switch is thrown to the right, the storage battery is thrown into circuit with the translating means.

I have illustrated a meter having a current-winding included in the main 2, this current-winding being subdivided into coils 17 17. The meter is also provided with a pressure-winding 18, included in bridge between the battery leads or mains. These windings of the meter are constantly in circuit with the battery irrespective of its association with the charging-machine or the translating means. The meter-winding 18 is preferably in the form of an armature and is mounted upon a spindle 19, at the lower end of which is provided a disk 20, arranged within the fields of damping-magnets 21 22. The shaft 19 also carries the commutator 23, against which bear brushes 24 24, that serve to include the armature of the meter in circuit, a choking resistance 25 being also included in circuit with the armature.

The meter is provided with gearing at its upper end to actuate the measuring-index 26, which by coöperation with a suitable reading-scale serves to indicate the amount of energy stored in the battery in charging and remaining in the battery in discharging.

The meter illustrated is adapted to measure in units of kilowatt-hours.

The rheostat resistance 27 is included in circuit with the armature. The arm 28 of the rheostat is carried upon the core 29 of a solenoid 30, whose energizing-winding is included in the branch 5, which branch is only closed when the storage battery is connected with the translating means. The resistance 27, however, or the branch including the same is always in circuit with the armature. When the switch 10 is thrown to the left, the entire resistance 27 is included in circuit with the armature, thereby effecting the greatest reduction in the field produced thereby to reduce the torque to cause a corresponding reduction in the speed of the meter per unit of load or energy while the battery is being charged. When the switch is thrown to the right, the solenoid-winding is included in circuit and being in series with the battery causes a movement of the rheostat-arm 28 to include more or less of the resistance 27 to modify the field due to the winding 18 sufficiently to produce a proper modification of the torque, and thereby cause an operation of the meter at a rate per unit of load or energy corresponding with the battery discharge to compensate for varying battery losses. For example, in the embodiment of the invention illustrated as the solenoid-core is drawn in upon an increased battery discharge the resistance 27 is correspondingly excluded from circuit with the armature, thereby increasing the field due to the winding 18, thereby enlarging the torque to increase the rate of speed of the meter per unit of load or energy to correspond with the increased battery discharge. If the battery discharge decreases, a greater amount of the resistance 27 is included in circuit to reduce the field due to the winding 18, thereby reducing the torque to cause a reduced rate of speed of operation of the meter per unit of load or energy to correspond with the reduced battery discharge.

Having thus described my invention, I claim as new and desire to secure by Letters Patent—

1. The combination with a storage battery, of a meter provided with a current-winding, a pressure-winding in the form of a revoluble armature, means for varying the field due to the pressure-winding, and electromagnetic means in series with the battery to be thereby subject to the varying current discharged from the battery to vary the torque according to the rate of battery discharge to correspondingly alter the rate of operation of the meter per unit of load or energy, substantially as described.

2. The combination with a storage battery, of a meter provided with a current-winding, a pressure-winding in the form of a revoluble armature, a rheostat resistance in circuit with said pressure-winding for varying the field due thereto, and electromagnetic means for varying the amount of said resistance and included in series with the battery to be thereby subject to the varying current discharged from the battery to vary the torque according to the rate of battery discharge to correspondingly alter the operation of the meter per unit of load or energy, substantially as described.

3. The combination with a storage battery, of a meter provided with a current-winding, a pressure-winding in the form of a revoluble armature, a rheostat resistance in circuit with said pressure-winding for varying the field due thereto, electromagnetic means for varying the amount of said resistance and included in series with the battery to be thereby subject to the varying current discharged from the battery to vary the torque according to the rate of battery discharge to correspondingly alter the operation of the meter per unit of load or energy, and means for excluding the electromagnetic means from circuit when the battery is connected with the charging-machine or source of current, substantially as described.

In witness whereof I hereunto subscribe my name this 16th day of August, A. D. 1901.

THOMAS DUNCAN.

Witnesses:
GEORGE L. CRAGG,
HERBERT F. OBERGFELL.